US010951815B2

(12) United States Patent
Yan et al.

(10) Patent No.: US 10,951,815 B2
(45) Date of Patent: Mar. 16, 2021

(54) IMAGING DEVICE, IMAGING CONTROL METHOD, ELECTRONIC APPARATUS, AND READABLE STORAGE MEDIA

(71) Applicant: BOE TECHNOLOGY GROUP CO., LTD., Beijing (CN)

(72) Inventors: Rongjian Yan, Beijing (CN); Li Tian, Beijing (CN); Junrui Zhang, Beijing (CN); Zhidong Wang, Beijing (CN); Lijia Zhou, Beijing (CN); Quanguo Zhou, Beijing (CN); Ronghua Lan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/425,674

(22) Filed: May 29, 2019

(65) Prior Publication Data
US 2020/0077018 A1 Mar. 5, 2020

(30) Foreign Application Priority Data
Aug. 31, 2018 (CN) .......................... 201811012562.2

(51) Int. Cl.
H04N 5/232 (2006.01)
G02F 1/1335 (2006.01)
H04N 5/225 (2006.01)

(52) U.S. Cl.
CPC ... H04N 5/23229 (2013.01); G02F 1/133526 (2013.01); H04N 5/2254 (2013.01)

(58) Field of Classification Search
None
See application file for complete search history.

(56) References Cited

U.S. PATENT DOCUMENTS 7,369,327 B1 5/2008 Nishioka
8,711,275 B2 * 4/2014 Rukes ................... H04N 5/232
348/241

(Continued)

FOREIGN PATENT DOCUMENTS

CN 102812393 A 12/2012
CN 103492935 A 1/2014
JP 2005345520 A 12/2005

OTHER PUBLICATIONS

First Office Action issued to Chinese Application No. 201811012562,2, dated Jan. 5, 2021 with English translation, (20p).

*Primary Examiner* — James M Hannett
(74) *Attorney, Agent, or Firm* — Arch & Lake LLP

(57) ABSTRACT

The present disclosure relates to an imaging device, an imaging control method, an electronic apparatus, and a readable storage media. The imaging device includes an image sensor, a spatial attitude sensor, a processor, a liquid crystal lens, and a control circuit. The liquid crystal lens is arranged on an imaging optical path of the image sensor and coupled to the control circuit. The spatial attitude sensor is configured to acquire a spatial attitude of the imaging device, and send the spatial attitude to the processor. The processor is configured to calculate an offset vector of the imaging device according to the spatial attitude, determine a light emission direction of the liquid crystal lens according to the offset vector, acquire a first control signal according to the light emission direction, and send the first control signal to the control circuit. The control circuit is configured to control the liquid crystal lens to swing focus according to the first control signal.

16 Claims, 5 Drawing Sheets

(56) References Cited

U.S. PATENT DOCUMENTS

| | | | |
|---|---|---|---|
| 10,345,600 B1* | 7/2019 | Chi | G02B 27/0172 |
| 10,368,002 B2* | 7/2019 | Kunick | H04N 5/2253 |
| 2010/0295987 A1* | 11/2010 | Berge | H04N 5/23248 |
| | | | 348/360 |
| 2014/0017625 A1* | 1/2014 | Liu | A61B 1/0019 |
| | | | 433/29 |
| 2014/0049682 A1* | 2/2014 | Galstian | G02B 7/38 |
| | | | 348/356 |
| 2015/0116591 A1* | 4/2015 | Han | G03B 5/00 |
| | | | 348/374 |
| 2016/0041449 A1* | 2/2016 | Clark | G02F 1/134309 |
| | | | 623/6.56 |
| 2020/0096678 A1* | 3/2020 | Kaminski | G02B 27/646 |

\* cited by examiner

IMAGING DEVICE, IMAGING CONTROL METHOD, ELECTRONIC APPARATUS, AND READABLE STORAGE MEDIA

CROSS-REFERENCE

This application is based upon and claims priority to Chinese Patent Application No. 201811012562.2, filed on Aug. 31, 2018, the entire contents thereof are incorporated herein by reference.

TECHNICAL FIELD

The present disclosure relates to the field of control technologies, and more particularly, to an imaging device, an imaging control method, an electronic apparatus, and a readable storage media.

BACKGROUND

At present, when users hold imaging devices to photograph images, hand trembling or muscle tremor may cause the imaging devices to dither, making the photographed images blurred and thus reducing photography experience.

SUMMARY

The present disclosure provides an imaging device, an imaging control method, an electronic apparatus, and a readable storage media.

According to a first aspect of arrangements of the present disclosure, there is provided an imaging device, which includes an image sensor, a spatial attitude sensor and a processor. The processor is coupled to the spatial attitude sensor. The imaging device further includes a liquid crystal lens and a control circuit. The liquid crystal lens is arranged on an imaging optical path of the image sensor and is coupled to the control circuit.

The spatial attitude sensor is configured to acquire spatial attitude information of the imaging device, and send the spatial attitude information to the processor.

The processor is configured to calculate an offset vector of the imaging device according to the spatial attitude information, determine a light emission direction of the liquid crystal lens according to the offset vector, acquire a first control signal according to the light emission direction, and send the first control signal to the control circuit.

The control circuit is configured to control the liquid crystal lens to swing focus according to the first control signal.

According to some arrangements, the spatial attitude sensor is a gyroscope sensor or an accelerometer sensor.

According to some arrangements, the processor is configured to determine whether the offset vector is within a preset offset vector range. The processor is configured to determine the light emission direction corresponding to the offset vector if the offset vector is within the preset offset vector range.

According to some arrangements, the processor is configured to acquire a first mapping relationship table between the light emission direction and a voltage after determining the light emission direction. The processor is configured to query a first voltage according to the light emission direction, based on the first mapping relationship table, the first voltage being the first control signal.

According to some arrangements, the processor is further configured to determine an imaging distance of the liquid crystal lens according to the offset vector, acquire a second control signal according to the imaging distance, and send the second control signal to the control circuit.

The control circuit is further configured to control the liquid crystal lens to adjust focus distance according to the second control signal.

According to some arrangements, the processor is configured to acquire a second mapping relationship table between a focal distance and a voltage after determining a variation of the imaging distance. The processor is configured to query a second voltage according to the imaging distance, based on the second mapping relationship table, the second voltage being the second control signal.

According to some arrangements, the liquid crystal lens includes a drive electrode and a common electrode arranged opposite to each other. The drive electrode includes a plurality of sub-electrodes annularly distributed.

According to a second aspect of the arrangements of the present disclosure, there is provided an imaging control method. The method includes calculating an offset vector of an imaging device according to spatial attitude information from a spatial attitude sensor. The method includes determining a light emission direction of a liquid crystal lens according to the offset vector. The method includes acquiring a first control signal according to the light emission direction, and sending the first control signal to a control circuit. As such, the control circuit can control the liquid crystal lens to swing focus according to the first control signal.

According to some arrangements, acquiring a first control signal according to the light emission direction includes acquiring a first mapping relationship table between the light emission direction and a voltage after determining the light emission direction, and querying a first voltage according to the light emission direction, based on the first mapping relationship table, the first voltage being the first control signal.

According to some arrangements, the method further includes determining an imaging distance of the liquid crystal lens according to the offset vector. The method includes acquiring a second control signal according to the imaging distance, and sending the second control signal to the control circuit. As such, the control circuit can control the liquid crystal lens to adjust a focus distance according to the second control signal.

According to some arrangements, acquiring a second control signal according to the imaging distance, and sending the second control signal to the control circuit include acquiring a second mapping relationship table between a focal distance and a voltage after determining the imaging distance, and querying a second voltage according to the imaging distance, based on the second mapping relationship table, the second voltage being the second control signal.

According to a third aspect of the arrangements of the present disclosure, there is provided an electronic apparatus, which includes the imaging device according to the first aspect.

According to a fourth aspect of the arrangements of the present disclosure, there is provided a computer-readable storage medium, which stores computer instructions. When the computer instructions are executed by a processor, the blocks of the method according to the second aspect are implemented.

It is to be understood that both the foregoing general description and the following detailed description are exemplary and explanatory only and are not restrictive of the present disclosure.

BRIEF DESCRIPTION OF THE DRAWINGS

The accompanying drawings herein are incorporated in and constitute a part of this specification, illustrate arrangements conforming to the present disclosure and together with the specification serve to explain the principles of the present disclosure.

DETAILED DESCRIPTION

Reference will now be made in detail to exemplary arrangements, examples of which are illustrated in the accompanying drawings. When accompanying figures are mentioned in the following descriptions, the same numbers in different drawings represent the same or similar elements, unless otherwise represented. The implementations set forth in the following description of exemplary arrangements do not represent all implementations consistent with the present disclosure. Instead, they are merely examples of apparatus and methods consistent with aspects related to the present disclosure as recited in the appended claims.

Figure 1:
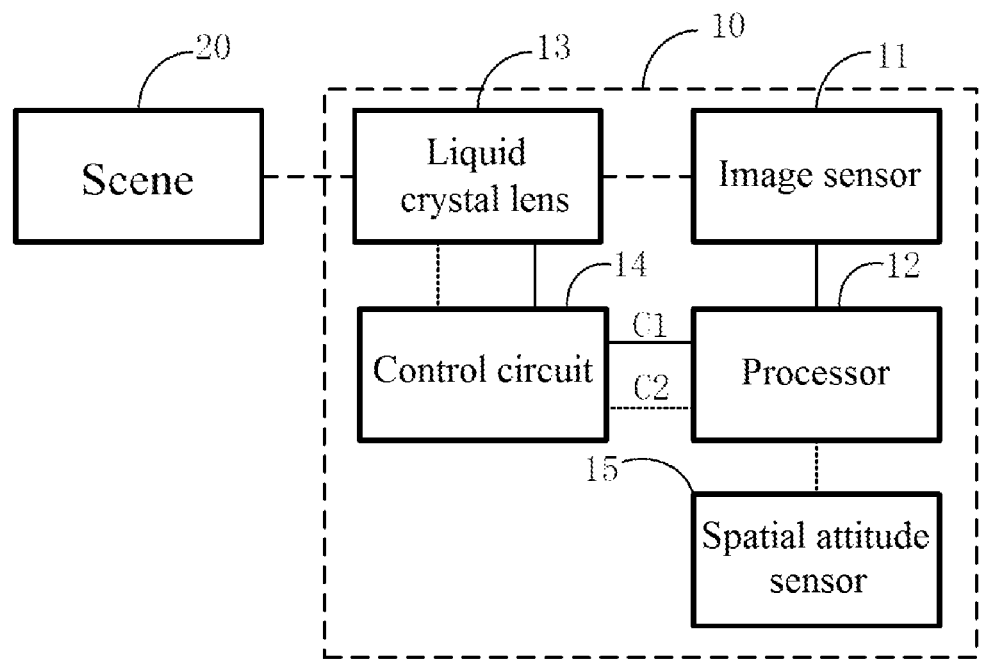
FIG. 1 illustrates a structural block diagram of an imaging device according to an arrangement of the present disclosure.

At present, when users hold imaging devices to photograph images, hand trembling or muscle tremor may cause the imaging devices to dither, making the photographed images blurred and thus reducing photography experience. For this reason, an arrangement of the present disclosure provides an imaging device. FIG. 1 illustrates a structural block diagram of an imaging device according to an arrangement of the present disclosure. Referring to FIG. 1, the imaging device 10 includes an image sensor 11, a processor 12, a liquid crystal lens 13, a control circuit 14, and a spatial attitude sensor 15. The processor 12 is coupled to the spatial attitude sensor 15. The liquid crystal lens 13 is arranged on an imaging optical path of the image sensor 11 and is coupled to the control circuit 14. The spatial attitude sensor 15 may be a gyroscope sensor or an accelerometer sensor. Those skilled in the art may make a selection according to a specific scenario, which is not limited herein.

When the imaging device 10 is moved, the spatial attitude sensor 15 may detect spatial attitude information of its own, such as angular variation, and acceleration, etc. The spatial attitude sensor 15 may be arranged at a preset location of the imaging device 10, for example, the preset location may be the inside of the imaging device 10. Therefore, the spatial attitude information of the spatial attitude sensor 15 may serve as the spatial attitude information of the imaging device 10. The spatial attitude sensor 15 may send the spatial attitude information to the processor 12 periodically.

The processor 12 may determine an offset vector of the imaging device 10 in combination with previous spatial attitude information, and the offset vector is a dithering vector of the imaging device 10. The offset vector may reflect an offset of the imaging device in the up and down, left and right, and/or front and rear directions.

Since the dithering vector of the imaging device 10 may reduce sharpness of the image frame captured by the image sensor 11, the processor 12 needs to compensate for the dithering vector of the imaging device 10. The compensation vector is opposite to the dithering vector in direction and is equal to the dithering vector in size, that is, the compensation vector is an inverse vector of the offset vector. Based on the compensation vector, the processor 12 may determine a light emission direction of the liquid crystal lens 13, then may generate a first control signal C1 according to the light emission direction and send the first control signal C1 to the control circuit 14.

It is to be appreciated that the processor 12 may compensate for the imaging device upon detection of the offset vector. However, if the offset vector is too large, after the processor 12 controls the liquid crystal lens to compensate, an image frame acquired by the image sensor 11 is still blurred, and thus no compensation is needed in this case. If the offset vector is too small, after the processor 12 controls the liquid crystal lens 13 to compensate, substantially there is no effect on blurriness of the image frame, that is, it is imperceptible to ordinary users. Therefore, an offset vector range may be preset in this arrangement. The minimum value and the maximum value of the offset vector range may be preset empirically or may be obtained statistically based on big data. When the offset vector is smaller than the minimum value of the offset vector range, the resolution of the image frame is not adversely affected, and thus no compensation is needed. When the offset vector is greater than the maximum value of the offset vector range, the resolution of the image frame obtained even after compensation is still adversely affected, and thus still no compensation is needed.

Based on the above analysis, the processor 12 may determine whether the offset vector at the current moment is within the preset offset vector range. If the offset vector is not within the offset vector range, it is not necessary to acquire the light emission direction of the liquid crystal lens, and the calculation amount of the processor may be reduced. If the offset vector is within the offset vector range, the processor determines the light emission direction of the liquid crystal lens according to the offset vector to perform dithering compensation for the imaging device.

Figure 2A:
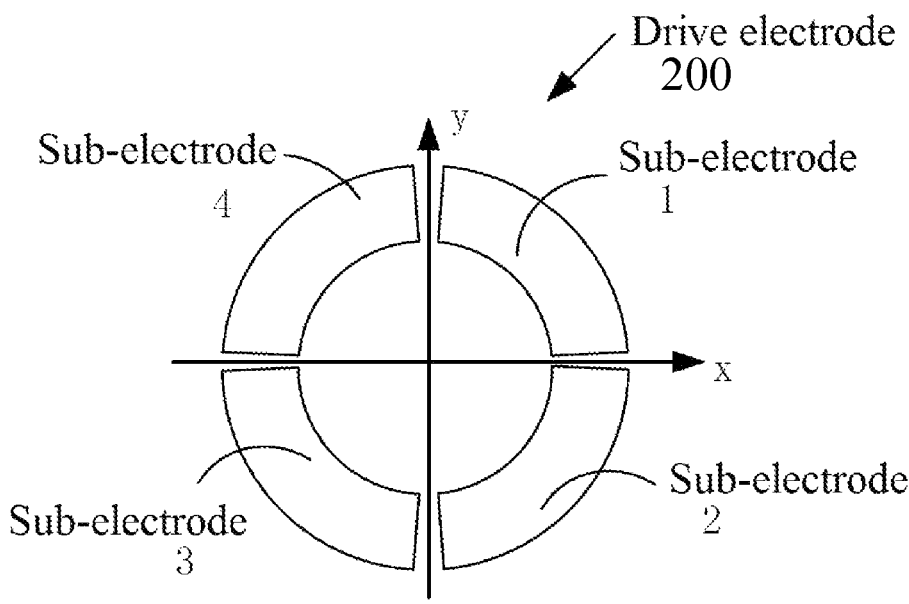
FIG. 2a is a schematic distribution diagram of sub-electrodes in a liquid crystal lens in the related art.
Figure 2B:
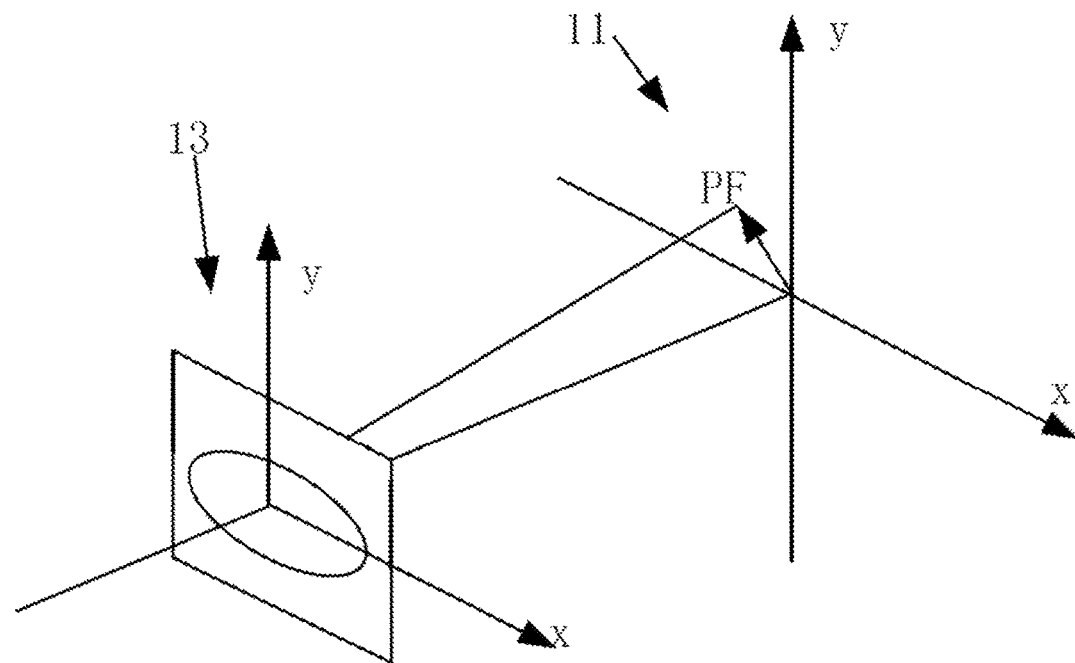
FIG. 2b is a schematic effect diagram of focus swing of a liquid crystal lens in the related art.

The control circuit 14 controls the liquid crystal lens 13 to swing focus according to the first control signal C1 (indicated by a solid line) to adjust a focal position of the liquid crystal lens 13. Reference is made to FIG. 2a and FIG. 2b. FIG. 2a illustrates that the liquid crystal lens includes a drive electrode 200 and a common electrode (not shown in the figure) arranged oppositely. The drive electrode 200 includes a plurality of sub-electrodes annularly distributed. For example, FIG. 2a illustrates four sub-electrodes annularly distributed. When the equal voltage is applied to the plurality of sub-electrodes, liquid crystal corresponding to each of the sub-electrodes may deflect equally, such that a focus of the liquid crystal lens is on an axis (perpendicular to a plane xoy, and moving in the z-axis direction) where an origin is, that is, the focus is not changed. Based on this principle, the focal distance of the liquid crystal lens can be adjusted by synchronously adjusting magnitudes of the voltages applied to the plurality of sub-electrodes. After different voltages are applied to the plurality of sub-electrodes, the liquid crystals in the corresponding regions of the different sub-electrodes may be subjected to corresponding deflections, and the deflections of the liquid crystals corresponding to all the sub-electrodes may form a lens of a specific shape, such that the light emission direction of the liquid crystal lens is changed. Finally, the focus of the liquid crystal lens deviates from x-axis, y-axis and/or z-axis, and the focal position as shown in FIG. 2b is obtained. FIG. 2b only illustrates variation of the focal position. The vector $P_F$ is a moving vector of the focus of the liquid crystal lens 13. In this arrangement, the control circuit 14 may enhance an input power of the liquid crystal lens 13, which can improve a control efficiency.

In an arrangement, based on an idea of determining the light emission direction, the processor 12 may also determine an imaging distance of the liquid crystal lens 13 according to the offset vector, and may obtain a focal distance of the liquid crystal lens based on the imaging distance. Next, the processor 12 may acquire a second control signal C2 according to the imaging distance, and send the second control signal C2 to the control circuit 14. For example, the processor 12 may acquire a second mapping relationship table between a focal distance and a voltage after determining the imaging distance. Next, based on the second mapping relationship table, the processor 12 may query a corresponding second voltage according to the imaging distance. The second voltage is the second control signal C2. Next, the control circuit 14 drives the liquid crystal lens 13 according to the second control signal C2 to adjust the focal distance.

It is to be noted that a mapping relationship exists between the light emission direction of the liquid crystal lens 13 and the voltages of the plurality of sub-electrodes, and the mapping relationship between the light emission direction and the voltages may be determined in advance. For example, the x-axis direction and the y-axis direction may be detected according to a preset step size, such that the light emission direction corresponding to each sub-electrode at different voltages may be obtained. For another example, a mapping relationship exists between the focal distance of the liquid crystal lens 13 and the voltages of the plurality of sub-electrodes, the same voltage may be applied to all the sub-electrodes, and then the magnitudes of the voltages may be synchronously adjusted. In this way, the focal distance of the liquid crystal lens 13 in the case of different voltages (but the voltages of the sub-electrodes are equal) are obtained. Next, all mapping relationships such as the first mapping relationship between the voltages and the light emission direction and the second mapping relationship between the voltages and the focal distance are stored in a specified location of a memory or the liquid crystal lens. Thus, the processor may obtain the voltages (i.e., the first control signal C1 and the second control signal C2) of different sub-electrodes according to the light emission direction or the imaging distance.

Thus, in this arrangement, by adjusting the focal distance and the light emission direction of the liquid crystal lens, the effect of adjusting the sharpness of the image frame captured by the image sensor may be achieved, the problem of image blurring caused by front and rear, up and down, and/or left and right dithering in the process of photographing images may be solved, and the objective of optical anti-dither may be achieved, which can in turn improve photography experience for users.

In an arrangement, the processor 12 also may adjust the focal distance of the liquid crystal lens according to the sharpness of the image frame captured by the image sensor 11 to compensate for the dithering of the imaging device. With continued reference to FIG. 1, light reflected in a scene 20 may be transmitted, through the liquid crystal lens 13, to the image sensor 11. The image sensor 11 may sense the light transmitted by the liquid crystal lens 13, such that an image frame may be captured, and then the captured image frame is transmitted to the processor 12.

After receiving the image frame, the processor 12 may acquire the sharpness of the image frame. There are two manners for acquiring the sharpness. In Manner I, the processor 12 calculates to obtain the sharpness according to a preset algorithm. In Manner II, the sharpness is a parameter of the image frame, and the processor 12 directly reads the sharpness parameter of the image frame to obtain the sharpness. Next, the processor 12 may determine the focal distance of the liquid crystal lens 13 according to the sharpness of the image frame, and may transmit the second control signal C2 generated according to the focal distance to the control circuit 14.

The control circuit 14 may receive the second control signal C2 (indicated by a dashed line) outputted from the processor 12 and generate a corresponding drive voltage, and then may drive, based on the drive voltage, the liquid crystal lens 13 to adjust the focal distance.

It is to be noted that the first control signal C1 and the second control signal C2 may be separately transmitted, or the first control signal C1 and the second control signal C2 may be processed as a vector sum signal and then transmitted, but not limited thereto, and those skilled in the art may adjust according to a specific scenario.

Thus, in this arrangement, the focal distance of the liquid crystal lens may be adjusted by controlling the sharpness of the image frame, the effect of adjusting the sharpness of the image frame captured by the image sensor may be achieved by controlling the focal distance, the problem of image blurring caused by front and rear dithering in the process of photographing images may be solved, and the objective of optical anti-dither may be achieved, which can improve photography experience for users.

Figure 3:
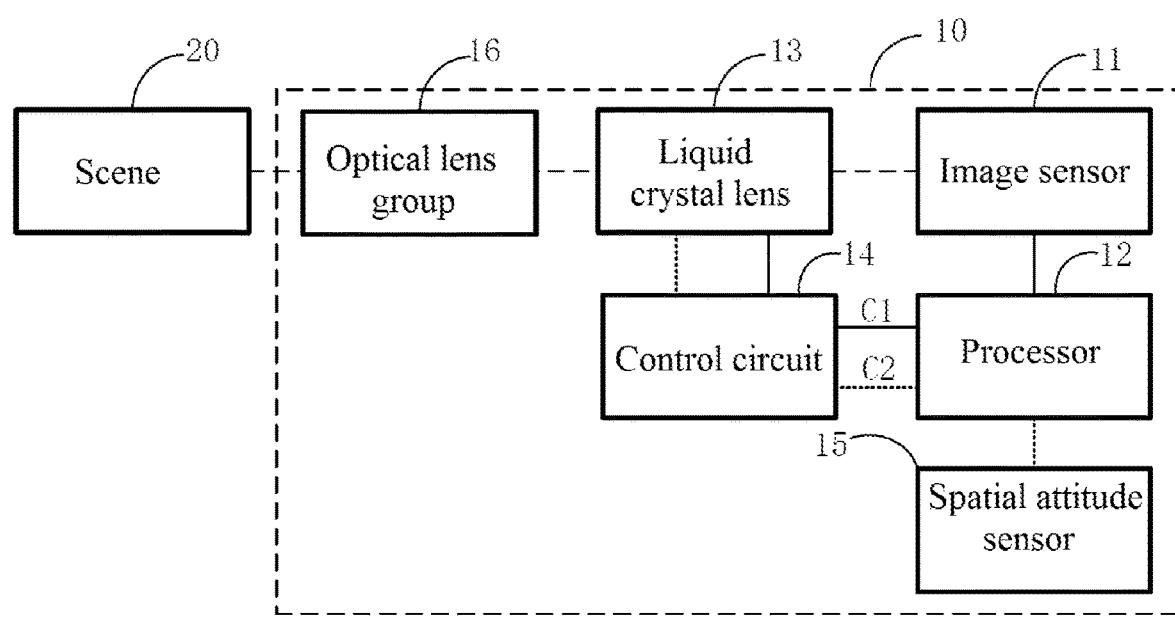
FIG. 3 illustrates a structural block diagram of another imaging device according to an arrangement of the present disclosure.

FIG. 3 illustrates a structural block diagram of still another imaging device according to an arrangement of the present disclosure. Referring to FIG. 3, the imaging device 10 may include the image sensor 11, the processor 12, the liquid crystal lens 13, the control circuit 14, and the spatial attitude sensor 15 of the imaging device as shown in FIG. 1. Reference may be made to descriptions of the imaging device as shown in FIG. 1 for specific connection modes and working principles of the imaging device 10, and thus specific descriptions of the imaging device 10 are omitted herein.

With continued reference to FIG. 3, the imaging device 10 may further include an optical lens group 16. The optical lens group 16 may be arranged on an imaging optical path of the image sensor 11.

In this arrangement, orders of the optical lens group 16 and the liquid crystal lens 13 on the imaging optical path may include:

Order I, referring to FIG. 3, FIG. 3 illustrates that the optical lens group 16 is arranged on the side of the liquid crystal lens 13 away from the image sensor 11, that is, the optical lens group 16 is in front of the liquid crystal lens 13. In this order, the size of the optical lens group 16 may be smaller than that of the liquid crystal lens 13, such that reduction in the size of the optical lens group 16 may reduce the volume and the weight of the imaging device 10. The size of the liquid crystal lens 13 is larger, such that a range of variation in the focal distance and a range of variation in the light emission direction may be increased, thus making it convenient for control.

Figure 4:
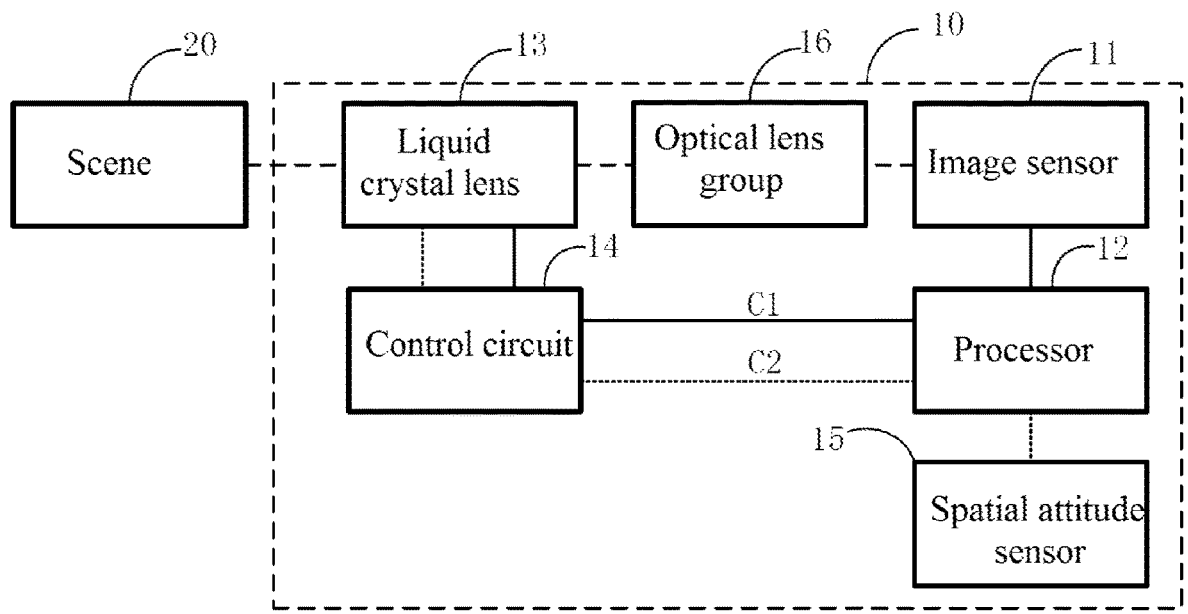
FIG. 4 illustrates a structural block diagram of still another imaging device according to an arrangement of the present disclosure.

Order II, referring to FIG. 4, FIG. 4 illustrates that the liquid crystal lens 13 is arranged on the side of the optical lens group 16 away from the image sensor 11, that is, the liquid crystal lens 13 is in front of the optical lens group 16. In this order, the size of the liquid crystal lens 13 becomes small, such that production difficulties may be reduced, which can improve a control precision.

Figure 5:
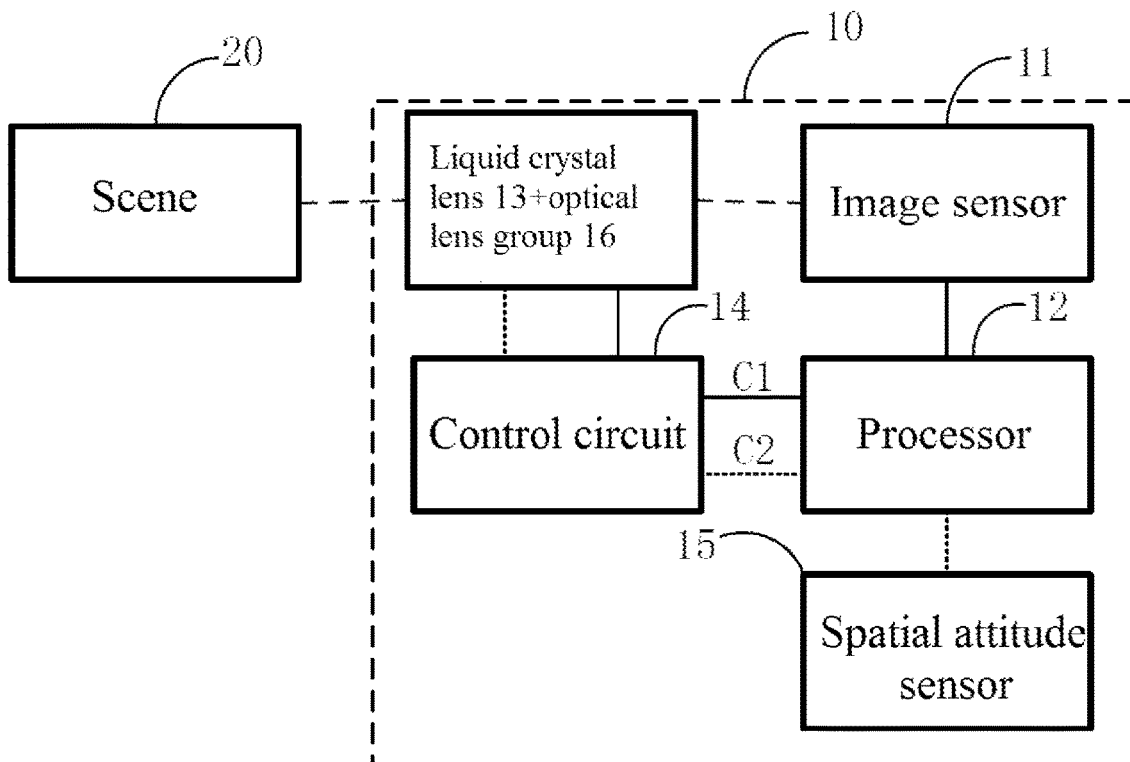
FIG. 5 illustrates a structural block diagram of still another imaging device according to an arrangement of the present disclosure.

Order III, referring to FIG. 5, in this arrangement, the liquid crystal lens 13 and the optical lens group 16 may be integrated, such that an installation distance between the liquid crystal lens 13 and the optical lens group 16 may be reduced, which can reduce the volume of the imaging device 10.

Thus, in this arrangement, the resolution of the imaging device may be improved by adding the optical lens group in the imaging device. Furthermore, in this arrangement, the focal distance and the light emission direction of the liquid crystal lens may be adjusted by controlling the sharpness of the image frame, the effect of adjusting the sharpness of the image frame captured by the image sensor may be achieved by controlling the focal distance and the light emission direction, the problem of image blurring caused by front and rear dithering and up and down dithering in the process of photographing images may be solved, and the objective of optical anti-dither may be achieved, which can improve photography experience for users.

Figure 6:
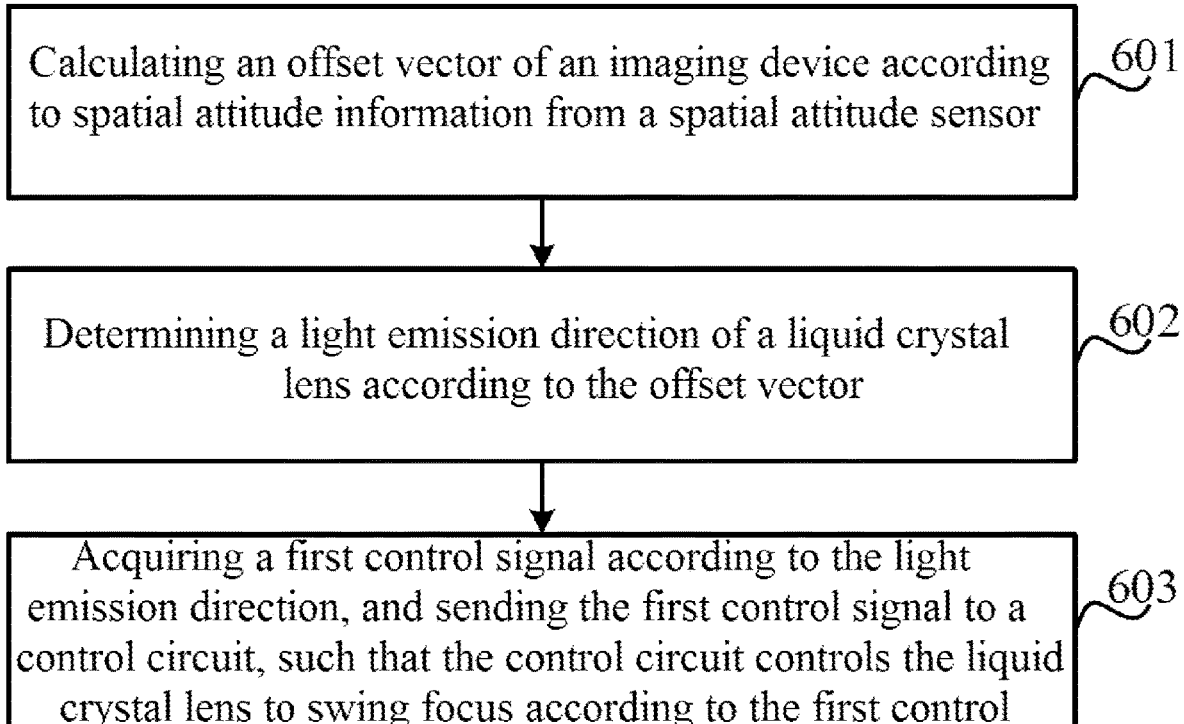
FIG. 6 illustrates a schematic flow diagram of an imaging control method according to an arrangement of the present disclosure.

An arrangement of the present disclosure also provides an imaging control method, FIG. 6 illustrates a schematic flow diagram of an imaging control method according to an arrangement of the present disclosure. Referring to FIG. 6, the imaging control method includes the following blocks.

Block 601: calculating an offset vector of an imaging device according to spatial attitude information from a spatial attitude sensor;

Block 602: determining a light emission direction of a liquid crystal lens according to the offset vector; and Block 603: acquiring a first control signal according to the light emission direction, and sending the first control signal to a control circuit, such that the control circuit controls the liquid crystal lens to swing focus according to the first control signal.

Figure 7:
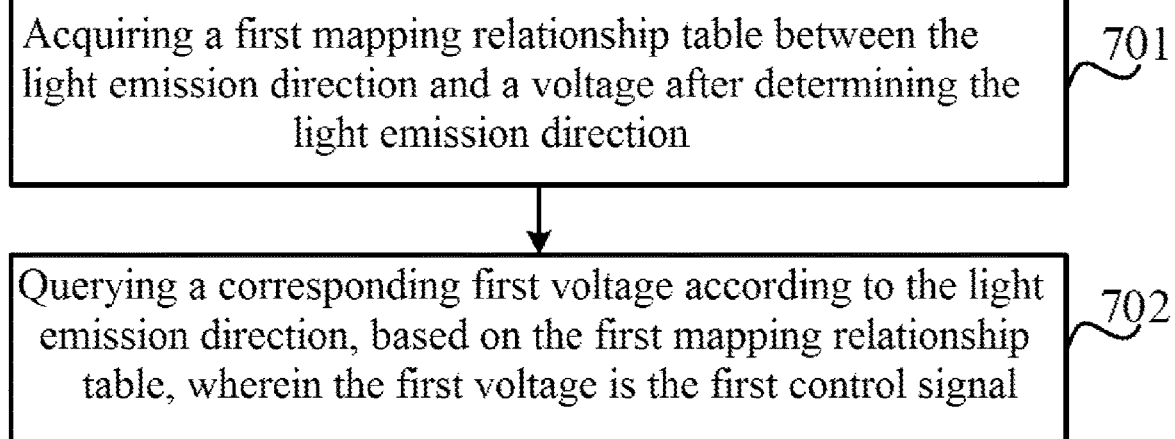
FIG. 7 illustrates a schematic flow diagram of another imaging control method according to an arrangement of the present disclosure.

In an arrangement, on the basis of the imaging control method as shown in FIG. 6, referring to FIG. 7, the acquiring a first control signal according to the light emission direction includes the following blocks.

Block 701: acquiring a first mapping relationship table between the light emission direction and a voltage after determining the light emission direction; and Block 702: querying a corresponding first voltage according to the light emission direction, based on the first mapping relationship table. The first voltage is the first control signal.

Figure 8:
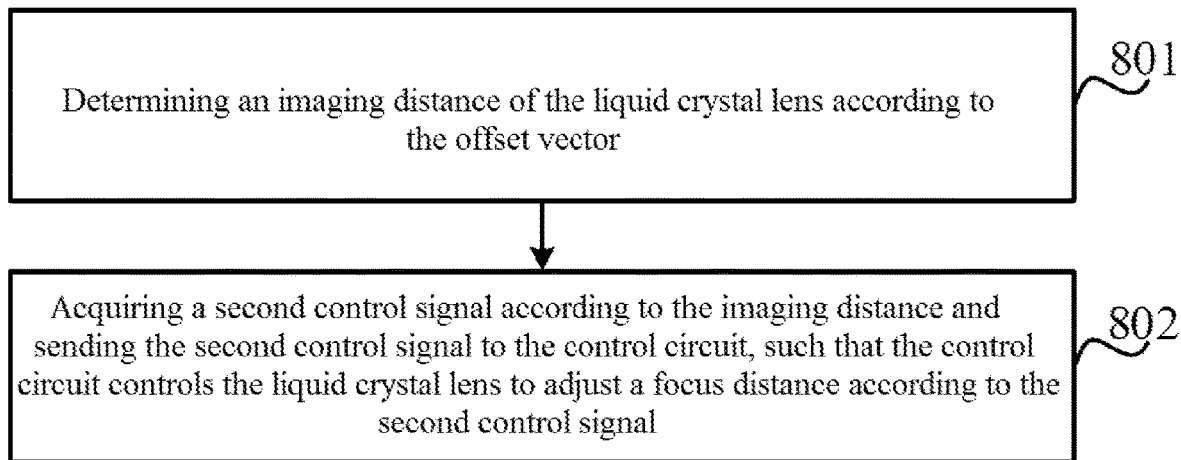
FIG. 8 illustrates a schematic flow diagram of still another imaging control method according to an arrangement of the present disclosure.

In an arrangement, on the basis of the imaging control method as shown in FIG. 6, referring to FIG. 8, the method also includes the following blocks.

Block 801: determining an imaging distance of the liquid crystal lens according to the offset vector; and Block 802: acquiring a second control signal according to the imaging distance and sending the second control signal to the control circuit, such that the control circuit controls the liquid crystal lens to adjust a focus distance according to the second control signal.

Figure 9:
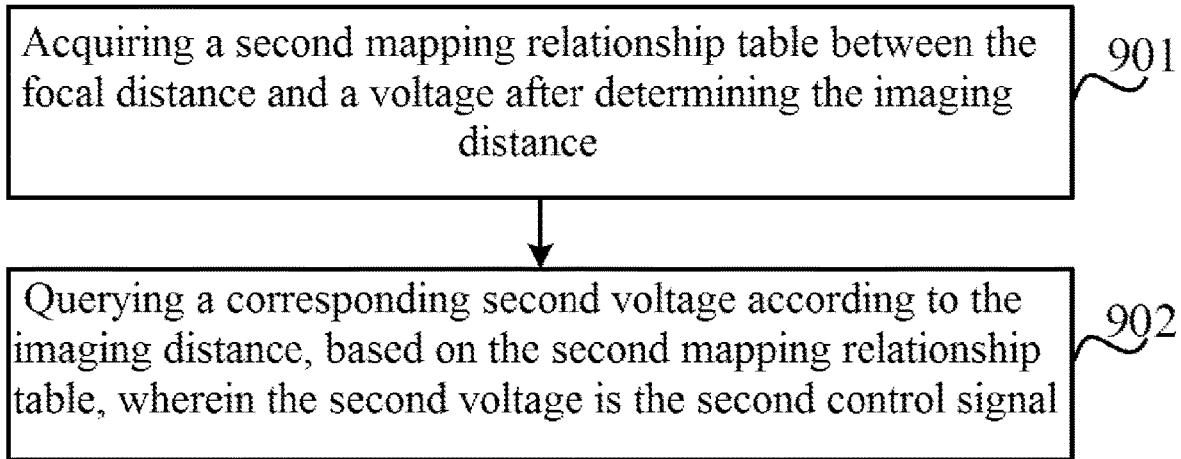
FIG. 9 illustrates a schematic flow diagram of still another imaging control method according to an arrangement of the present disclosure.

In an arrangement, on the basis of the imaging control method as shown in FIG. 6, referring to FIG. 9, the acquiring a second control signal according to the imaging distance and sending the second control signal to the control circuit include the following blocks.

Block 901: acquiring a second mapping relationship table between the focal distance and a voltage after determining the imaging distance; and Block 902: querying a corresponding second voltage according to the imaging distance, based on the second mapping relationship table. The second voltage is the second control signal.

It is to be noted that since the blocks of the methods as shown in FIGS. 6-9 have been described in detail in the arrangements of the imaging device as shown in FIG. 1, reference may be made to the corresponding arrangements for related contents, and thus their detailed descriptions are omitted herein.

An arrangement of the present disclosure further provides an electronic apparatus, including the imaging device as shown in FIGS. 1-5. The electronic apparatus can be a mobile phone, a tablet computer, a television set, and an apparatus that requires an imaging device. Those skilled in the art may configure the imaging device into a corresponding apparatus according to a specific scene to obtain the electronic apparatus, and the corresponding imaging device and electronic apparatus also fall into the scope of protection of the present application.

An arrangement of the present disclosure also provides a computer readable storage medium, storing a computer program. When the program is executed by a processor, the blocks of the methods as shown in FIGS. 6-9 are performed.

It is to be noted that the computer readable storage medium may be applied to the imaging device, the electronic apparatus, and so on, and those skilled in the art may select according to specific scenarios, which is not limited here.

In the present disclosure, terms "first" and "second" are merely for description purposes, and are not construed as indicating or implying relative importance. Unless otherwise explicitly stated, the term "a plurality of" means two or more than two.

Other arrangements of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and arrangements be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. An imaging device comprising an image sensor, a spatial attitude sensor and a processor, the processor being coupled to the spatial attitude sensor;
    wherein the imaging device further comprising a liquid crystal lens and a control circuit; the liquid crystal lens being arranged on an imaging optical path of the image sensor and coupled to the control circuit;
    wherein the spatial attitude sensor is configured to acquire spatial attitude information of the imaging device, and send the spatial attitude information to the processor;
    wherein the processor is configured to calculate an offset vector of the imaging device according to the spatial attitude information, determine a light emission direction of the liquid crystal lens according to the offset vector, acquire a first control signal according to the light emission direction, and send the first control signal to the control circuit; and
    wherein the control circuit is configured to control the liquid crystal lens to swing focus according to the first control signal,
    wherein the processor is further configured to:
    acquire a first mapping relationship table between the light emission direction and a voltage after determining the light emission direction, wherein the first mapping relationship is pre-stored in the imaging device; and
    query, according to the light emission direction, a first voltage from the first mapping relationship table, wherein the first voltage is the first control signal.

2. The imaging device according to claim 1, wherein the spatial attitude sensor comprises at least one of a gyroscope sensor and an accelerometer sensor.

3. The imaging device according to claim 1, wherein the processor is configured to:
    determine the light emission direction of the liquid crystal lens according to the offset vector when the offset vector is within a preset offset vector range.

4. The imaging device according to claim 1, wherein the processor is further configured to determine an imaging distance of the liquid crystal lens according to the offset vector, acquire a second control signal according to the imaging distance, and send the second control signal to the control circuit; and
    the control circuit is further configured to control the liquid crystal lens to adjust a focal distance according to the second control signal.

5. The imaging device according to claim 4, wherein the processor is configured to:
    acquire a second mapping relationship table between the focal distance and a voltage after determining the imaging distance; and
    query a second voltage according to the imaging distance, based on the second mapping relationship table, wherein the second voltage is the second control signal.

6. The imaging device according to claim 1, wherein the liquid crystal lens comprises a drive electrode and a common electrode arranged opposite to each other, the drive electrode comprises a plurality of sub-electrodes annularly distributed.

7. An imaging control method, comprising:
    calculating an offset vector of an imaging device according to spatial attitude information from a spatial attitude sensor;
    determining a light emission direction of a liquid crystal lens according to the offset vector; and
    acquiring a first control signal according to the light emission direction, and sending the first control signal to a control circuit to control the liquid crystal lens to swing focus according to the first control signal,
    wherein the acquiring the first control signal according to the light emission direction comprises:
    acquiring a first mapping relationship table between the light emission direction and a voltage after determining the light emission direction, wherein the first mapping relationship is pre-stored in the imaging device; and
    querying, according to the light emission direction, a first voltage from the first mapping relationship table, wherein the first voltage is the first control signal.

8. The imaging control method according to claim 7, further comprising:
    determining an imaging distance of the liquid crystal lens according to the offset vector; and
    acquiring a second control signal according to the imaging distance, and sending the second control signal to the control circuit, such that the control circuit controls the liquid crystal lens to adjust a focus distance according to the second control signal.

9. The imaging device according to claim 8, wherein acquiring a second control signal according to the imaging distance, and sending the second control signal to the control circuit comprise:
    acquiring a second mapping relationship table between the focal distance and a voltage after determining the imaging distance; and
    querying a second voltage according to the imaging distance, based on the second mapping relationship table,
    wherein the second voltage is the second control signal.

10. An electronic apparatus, having an imaging device comprising an image sensor, a spatial attitude sensor and a processor, the processor being coupled to the spatial attitude sensor;
    wherein the imaging device further comprising a liquid crystal lens and a control circuit; the liquid crystal lens being arranged on an imaging optical path of the image sensor and coupled to the control circuit;
    wherein the spatial attitude sensor is configured to acquire spatial attitude information of the imaging device, and send the spatial attitude information to the processor;
    wherein the processor is configured to calculate an offset vector of the imaging device according to the spatial attitude information, determine a light emission direction of the liquid crystal lens according to the offset vector, acquire a first control signal according to the light emission direction, and send the first control signal to the control circuit; and
    wherein the control circuit is configured to control the liquid crystal lens to swing focus according to the first control signal,
    wherein the processor is further configured to:
    acquire a first mapping relationship table between the light emission direction and a voltage after determining the light emission direction, wherein the first mapping relationship is pre-stored in the imaging device; and
    query, according to the light emission direction, a first voltage from the first mapping relationship table, wherein the first voltage is the first control signal.

11. The electronic apparatus according to claim 10, wherein the spatial attitude sensor comprises at least one of a gyroscope sensor and an accelerometer sensor.

12. The electronic apparatus according to claim 10, wherein the processor is configured to:
   determine the light emission direction of the liquid crystal lens according to the offset vector when the offset vector is within a preset offset vector range.

13. The electronic apparatus according to claim 10, wherein the processor is further configured to determine an imaging distance of the liquid crystal lens according to the offset vector, acquire a second control signal according to the imaging distance, and send the second control signal to the control circuit; and
   the control circuit is further configured to control the liquid crystal lens to adjust a focal distance according to the second control signal.

14. The electronic apparatus according to claim 13, wherein the processor is configured to:
   acquire a second mapping relationship table between the focal distance and a voltage after determining the imaging distance; and
   query a second voltage according to the imaging distance, based on the second mapping relationship table,
   wherein the second voltage is the second control signal.

15. The electronic apparatus according to claim 10, wherein the liquid crystal lens comprises a drive electrode and a common electrode arranged opposite to each other, the drive electrode comprises a plurality of sub-electrodes annularly distributed.

16. A non-transitory computer readable storage medium, storing a computer program which, when being executed by a processor, causes steps of the method according to claim 7 to be implemented.

\* \* \* \* \*